United States Patent
Cieler et al.

(10) Patent No.: US 8,878,932 B2
(45) Date of Patent: Nov. 4, 2014

(54) SYSTEM AND METHOD FOR DETECTING THE SURROUNDING ENVIRONMENT OF A MOTOR VEHICLE USING AS ADJUSTABLE INFRARED NIGHT VISION SYSTEM

(75) Inventors: Stephan Cieler, Frankfurt (DE); Vera Donk, Danjoutin (FR); Reinfried Grimmel, Friedberg (DE); Norbert Schmidt, Eppstein (DE)

(73) Assignee: Continental Automotive GmbH, Hannover (DE)

( * ) Notice: Subject to any disclaimer, the term of this patent is extended or adjusted under 35 U.S.C. 154(b) by 1197 days.

(21) Appl. No.: 11/994,011

(22) PCT Filed: May 15, 2006

(86) PCT No.: PCT/JP2006/062292
§ 371 (c)(1),
(2), (4) Date: Jan. 4, 2008

(87) PCT Pub. No.: WO2007/003463
PCT Pub. Date: Jan. 11, 2007

(65) Prior Publication Data
US 2008/0198227 A1 Aug. 21, 2008

(30) Foreign Application Priority Data
Jul. 1, 2005 (DE) .......................... 10 2005 030 838

(51) Int. Cl.
*H04N 7/18* (2006.01)
*B60R 11/04* (2006.01)
*B60R 1/00* (2006.01)
*B60R 11/00* (2006.01)

(52) U.S. Cl.
CPC ........... *B60R 11/04* (2013.01); *B60R 2300/101* (2013.01); *B60R 2011/004* (2013.01); *B60R 2011/0022* (2013.01); *B60R 2300/8053* (2013.01); *B60R 2300/106* (2013.01); *B60R 2300/308* (2013.01); *B60R 1/00* (2013.01); *B60R 2011/008* (2013.01)
USPC ......................................................... 348/148

(58) Field of Classification Search
USPC ......... 348/135, 148, 42, 218.1; 382/103, 104, 382/105, 106; 701/1; 362/507; 250/330; 340/435, 901
See application file for complete search history.

(56) References Cited

U.S. PATENT DOCUMENTS

| | | | |
|---|---|---|---|
| 5,172,317 A * | 12/1992 | Asanuma et al. | 701/28 |
| 6,150,930 A | 11/2000 | Cooper | 340/435 |
| 6,476,731 B1 * | 11/2002 | Miki et al. | 340/937 |
| 6,515,597 B1 * | 2/2003 | Wada et al. | 340/988 |
| 6,593,960 B1 * | 7/2003 | Sugimoto et al. | 348/148 |
| 7,561,719 B2 * | 7/2009 | Nagaoka et al. | 382/103 |
| 7,592,592 B2 * | 9/2009 | Eriksson | 250/330 |

(Continued)

FOREIGN PATENT DOCUMENTS

| | | | | |
|---|---|---|---|---|
| CN | 1266197 A | 9/2000 | | B60R 1/00 |
| EP | 1391769 | 8/2003 | | G02B 23/12 |

(Continued)

*Primary Examiner* — Imad Hussain
(74) *Attorney, Agent, or Firm* — King & Spalding L.L.P.

(57) ABSTRACT

In a night vision system with which an image recording unit records the image of the surroundings of a motor vehicle, the recorded image is displayed by means of a display, wherein the position of the image recording device (2) is changed according to the driving situation.

16 Claims, 3 Drawing Sheets

(56) References Cited

U.S. PATENT DOCUMENTS

| | | | |
|---|---|---|---|
| 7,600,929 B2* | 10/2009 | Kim et al. | 396/427 |
| 2003/0174865 A1* | 9/2003 | Vernon | 382/105 |
| 2004/0034452 A1* | 2/2004 | Miller et al. | 701/1 |
| 2004/0207515 A1* | 10/2004 | Chung | 340/435 |
| 2004/0257442 A1* | 12/2004 | Eggers et al. | 348/148 |
| 2005/0063565 A1* | 3/2005 | Nagaoka et al. | 382/104 |
| 2005/0074221 A1 | 4/2005 | Remillard et al. | 385/147 |
| 2005/0102070 A1* | 5/2005 | Takahama et al. | 701/1 |
| 2005/0110621 A1 | 5/2005 | Hahn et al. | 340/435 |
| 2005/0113995 A1* | 5/2005 | Oyaide | 701/36 |
| 2005/0146458 A1* | 7/2005 | Carmichael et al. | 342/52 |
| 2005/0225636 A1* | 10/2005 | Maemura et al. | 348/148 |
| 2005/0237385 A1* | 10/2005 | Kosaka et al. | 348/42 |
| 2005/0276447 A1* | 12/2005 | Taniguchi et al. | 382/103 |
| 2005/0276450 A1* | 12/2005 | Taniguchi et al. | 382/104 |
| 2006/0038885 A1* | 2/2006 | Eggers et al. | 348/135 |
| 2006/0215020 A1* | 9/2006 | Mori et al. | 348/119 |
| 2007/0069135 A1 | 3/2007 | Kraft | 250/339.12 |
| 2007/0154068 A1* | 7/2007 | Stein et al. | 382/106 |
| 2007/0211484 A1* | 9/2007 | Marchal | 362/507 |
| 2007/0291130 A1* | 12/2007 | Broggi et al. | 348/218.1 |
| 2008/0007428 A1* | 1/2008 | Watanabe et al. | 340/901 |
| 2008/0273750 A1* | 11/2008 | Fujimoto | 382/103 |
| 2009/0079828 A1* | 3/2009 | Lee et al. | 348/148 |
| 2009/0153662 A1* | 6/2009 | Abel et al. | 348/148 |
| 2010/0283633 A1* | 11/2010 | Becker et al. | 340/932.2 |
| 2010/0299109 A1* | 11/2010 | Saito | 703/1 |

FOREIGN PATENT DOCUMENTS

| | | | | |
|---|---|---|---|---|
| JP | 5174296 A | | 7/1993 | B60R 5/00 |
| JP | 09270098 A | * | 10/1997 | G08G 1/16 |
| JP | 11312300 A | | 11/1999 | B60R 11/04 |
| JP | 2004291663 A | * | 10/2004 | G03B 15/00 |

* cited by examiner

SYSTEM AND METHOD FOR DETECTING THE SURROUNDING ENVIRONMENT OF A MOTOR VEHICLE USING AS ADJUSTABLE INFRARED NIGHT VISION SYSTEM

CROSS-REFERENCE TO RELATED APPLICATIONS

This application is a U.S. national stage application of International Application No. PCT/EP2006/062292 filed May 15, 2006, which designates the United States of America, and claims priority to German application number 10 2005 030 838.4 filed Jul. 1, 2005, the contents of which are hereby incorporated by reference in their entirety.

TECHNICAL FIELD

The invention relates to a night vision system in which an image recording unit records the image of the surroundings of a motor vehicle, and the recorded image is processed in an image processing device and displayed in a display.

BACKGROUND

Such systems in which infrared cameras are present as image recording units and the image which is recorded by the infrared cameras is displayed on a display are known from the prior art. In this context, the infrared cameras have specific lenses so that what is displayed on the display is secured at a specific viewing angle. As a result, it is not possible to adapt the image excerpt to a current driving task or to the information requirement of the driver.

SUMMARY

According to an embodiment, in a night vision system in which an image recording unit records the image of the surroundings of a motor vehicle, and the recorded image is displayed by means of a display, the position of the image recording device is changed as a function of the driving situation, and a vertical adjustability of the image recording device depends on the type of road on which the vehicle is travelling.

According to a further embodiment, the image recording device can be pivoted vertically as a function of the speed at which the vehicle is travelling. According to a further embodiment, the horizontal position of the image recording device can be changed. According to a further embodiment, the horizontal position of the image recording device can be changed as a function of the road profile. According to a further embodiment, the image recording device can be embodied as an infrared camera. According to a further embodiment, an infrared lighting device may be present. According to a further embodiment, the image recording device can be embodied as a radar. According to a further embodiment, the display can be embodied as a head-up display.

BRIEF DESCRIPTION OF THE DRAWINGS

The invention is explained in more detail below with reference to the figures, in which.

DETAILED DESCRIPTION

Figure 1:
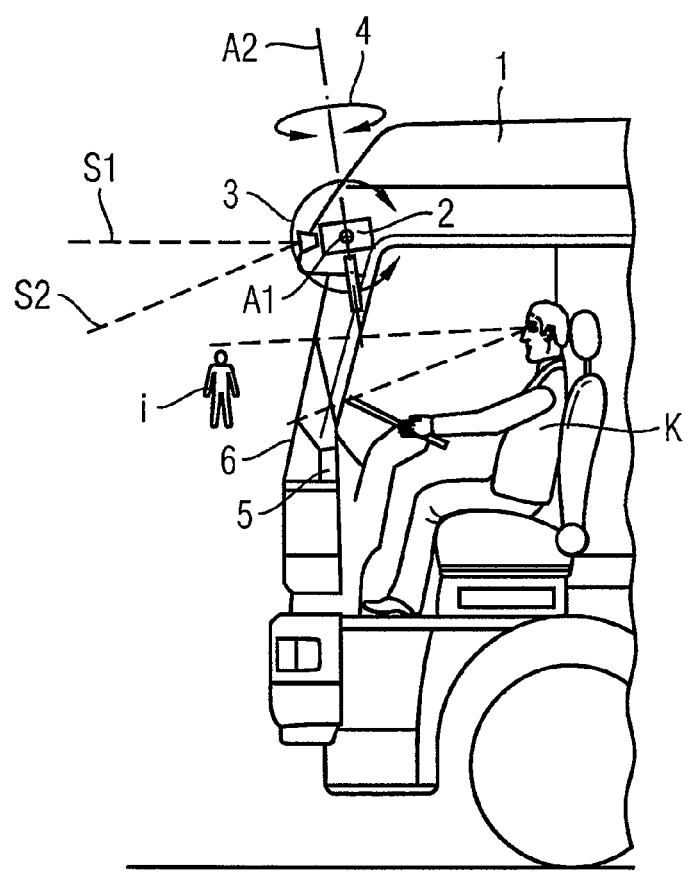
FIG. 1 shows part of a motor vehicle with an exemplary embodiment of a night vision system according to an embodiment.

A night vision system of the abovementioned type in which the image excerpt is adapted to the current driving task and the information requirement of the driver can be specified by virtue of the fact that the position of the image recording device is changed as a function of the driving situation. The changing of the position of the image recording device brings about an optimum position of the image recording device for the respective driving situation and thus an optimum position of the display of the surroundings of the motor vehicle. It is particularly advantageous to pivot the image recording device vertically as a function of the speed at which the vehicle is traveling. Therefore, in the stationary state and at low speeds the image recording device is pivoted in such a way that the area directly in front of the vehicle can be perceived in an optimum way. This is advantageous in particular in the case of utility vehicles in which the driver of the motor vehicle is seated at a very high position above the roadway and cannot see the area directly in front of the vehicle itself despite the presence of lighting since a dead angle is present here. As the speed increases, the drivers of motor vehicles usually orient themselves in regions in front of the motor vehicle which are further away, so that when obstacles occur they can react correspondingly. For this reason, as the speed increases the image recording device is advantageously pivoted vertically in such a way that it can record objects which are further away and which can then be displayed by means of the display. If information relating to the type of road on which the vehicle is travelling is available to the night vision system, for example if it is connected to a navigation system or if the recorded images are correspondingly evaluated and a corresponding type of road is classified, the image recording unit can be correspondingly pivoted in accordance with the type of road. In particular in such a way that in the case of types of road with usually low speeds the image recording unit is set in such a way that the area which is closer in front of the motor vehicle is recorded, and in the case of road types in which the vehicles usually travel at high speeds the image recording unit is pivoted in such a way that objects which are further away can be recorded. Even if the horizontal position of the image recording unit is changed, the information can be improved further. In particular if the horizontal position of the image recording unit is changed as a function of the road profile. It is therefore possible to perceive objects which are not located in a straight line in front of the motor vehicle but rather, in the case of a corresponding road profile which has bends, are situated at another location on the road.

An infrared camera can advantageously be used as the image recording unit. As a result, it is possible, on the one hand, to display objects which are located in the vicinity of the normal headlights. It is also possible for objects which can also be located outside the vicinity of headlights to be recorded by means of their thermal radiation and displayed on the display.

If there is an infrared lighting device, the performance of the infrared cameras can also be increased. In the case of an embodiment of the image recording device as radar, the function is less disrupted under bad weather conditions, such as for example heavy rain or snowfall, than in the case of an infrared system.

If the display is embodied as a head-up display, the driver of the motor vehicle is distracted least since the display is projected as a virtual image onto the windshield of the motor vehicle and the display can therefore be perceived at the same time as the actual events in front of the motor vehicle. Of course, it is also possible to provide the display as a separate component, for example in the center console or in the combined instrument of the motor vehicle. However, in such a case the motor vehicle driver is impeded from directly viewing the roadway at the same time.

FIG. 1 shows part of a motor vehicle 1 and a motor vehicle driver K. The motor vehicle has an image recording device 2 which can be pivoted vertically about an axis A1 and horizontally about an axis A2, as indicated by the double arrows 3, 4. The motor vehicle 1 also has a projection unit of a head-up display 5 and a windshield 6. The image recorded by the image recording device 2 is either processed in an image processing device (not illustrated) and projected onto the windshield 6 by means of the projection unit 5 of the head-up display, or transmitted directly from the image recording device 2 to the projection unit 5 of the head-up display and then projected onto the windshield 6. The motor vehicle driver can perceive the image recorded by the image recording device 2 and projected onto the windshield 6 as a virtual image i which can be perceived behind the windshield 6 by the motor vehicle driver. By virtue of the embodiment as a head-up display, the motor vehicle driver can simultaneously perceive the information recorded by the image recording device and simultaneously the actual environment located in front of the motor vehicle.

Figure 2:
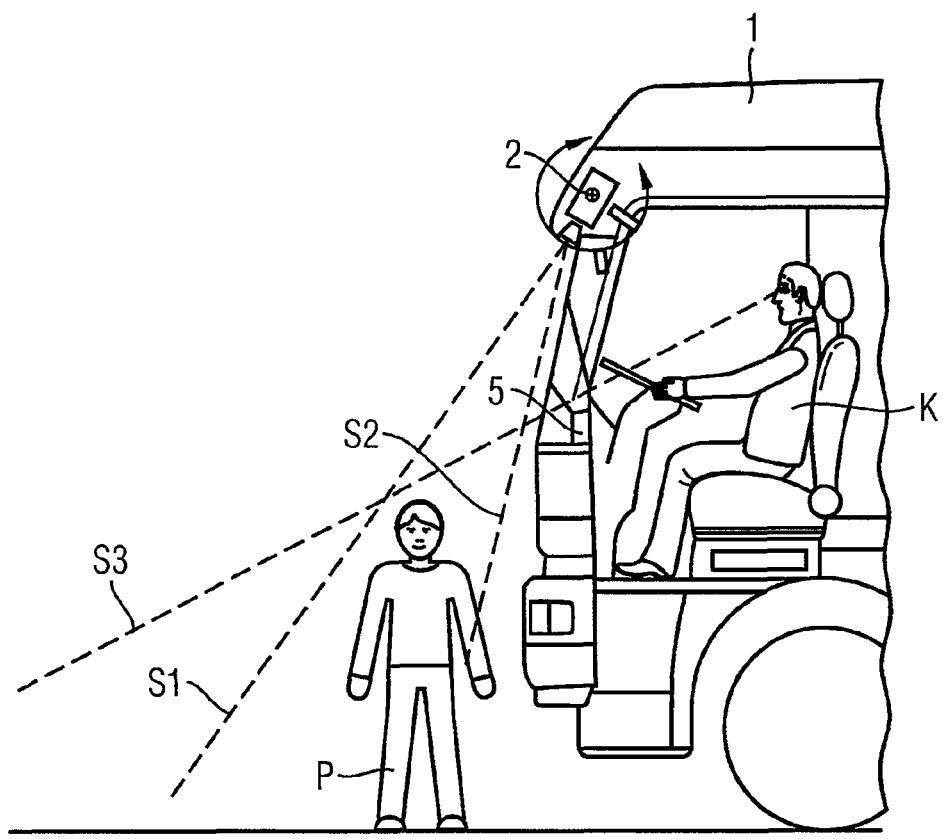
FIG. 2 shows the motor vehicle from FIG. 1 in which the image recording unit is pivoted vertically downwards.

FIG. 2 shows a person P who is located directly in front of the motor vehicle 1, below the line S3 which constitutes the lower boundary of the field of vision of the motor vehicle driver. As a result, the person P is located in the dead angle and cannot be perceived directly by the motor vehicle driver K. Since the motor vehicle is stationary, the image recording device 2 is pivoted vertically downwards so that its recording range, which is bounded by the beams S1 and S2, records the reality directly in front of the motor vehicle 1. The person P is projected onto the windshield by means of the head-up display, and the motor vehicle driver can perceive that the person P is located in front of his motor vehicle.

Figure 3:
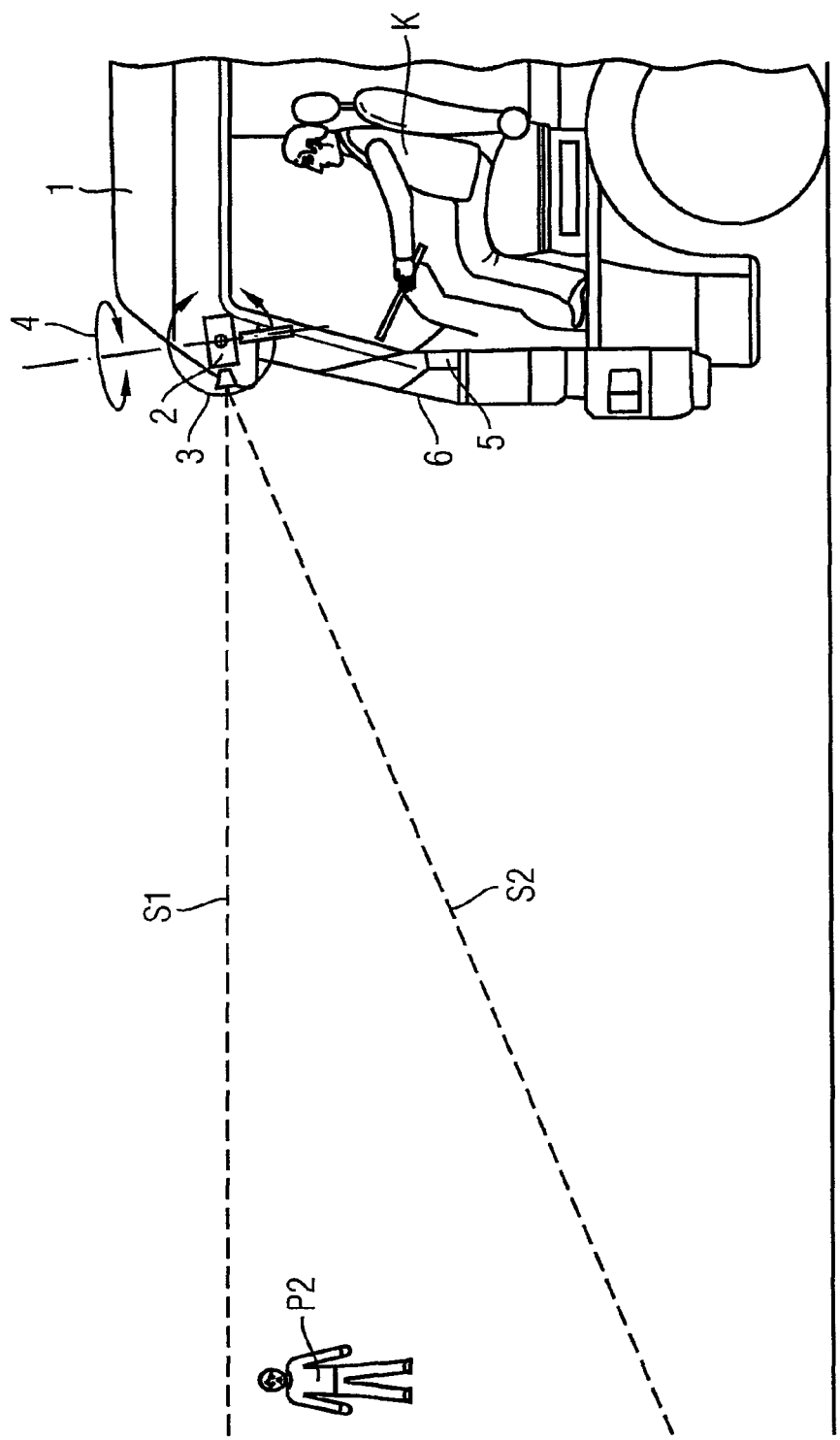
FIG. 3 shows the motor vehicle from FIG. 1 in which the image recording unit of the night vision system is pivoted vertically upwards.

In FIG. 3, the motor vehicle 1 has an average speed so that the image recording device 1 assumes a virtually horizontal position so that it records the area which is bounded by the beams S1, S2. It can therefore record the image of the person P2. The image which is recorded in this way is projected onto the windshield 6 by means of the projection unit 5 of the head-up display so that the motor vehicle driver can perceive the image of the person as a virtual image, even if the person is located outside the range of the headlights of the motor vehicle. The invention can, of course, also be formed with a different display. However, in such a case the motor vehicle driver has to take his view away from the roadway located in front of the vehicle so that he cannot simultaneously perceive the reality which is actually occurring.

What is claimed is:

1. A night vision system comprising:
   an image recording unit recording the image of the surroundings of a motor vehicle;
   a display showing the recorded image; and
   a pivot for adjusting the vertical position of the image recording device, wherein the vertical position of the image recording device depends at least in part on a forward speed of the vehicle, such that the image recording device is pivoted upwardly when the forward speed of the vehicle increases and pivoted downwardly, so as to record an image outside a lower boundary of a forward field of vision of the motor vehicle driver through aから windshield of the motor vehicle, when the forward speed of the vehicle decreases, and
   a processor programmed to:
      receive information regarding a road on which the vehicle is travelling,
      determine, based on the received information regarding the road, a typical speed of travel associated with the road, and
   wherein the vertical position of the image recording device further depends at least in part on the determined typical speed of travel associated with the road on which the vehicle is travelling.

2. The night vision system according to claim 1, wherein a horizontal position of the image recording device is changed.

3. The night vision system according to claim 1, wherein a horizontal position of the image recording device is changed as a function of the road profile.

4. The night vision system according to claim 1, wherein the image recording device is embodied as an infrared camera.

5. The night vision system according to claim 4, wherein an infrared lighting device is present.

6. The night vision system according to claim 1, wherein the image recording device is embodied as a radar.

7. The night vision system according to claim 1, wherein the display is embodied as a head-up display.

8. A method of providing night vision in a vehicle, the method comprising the steps of:
   recording an image of the surroundings of a motor vehicle by an image recording device,
   displaying the recorded image by means of a display, and
   controlling a vertical position of the image recording device based at least in part on a forward speed of the vehicle, such that the image recording device is pivoted upwardly when the forward speed of the vehicle increases and pivoted downwardly, so as to record an image outside a lower boundary of a forward field of vision of a motor vehicle driver through a front windshield of the motor vehicle, when the forward speed of the vehicle decreases,
   receiving information regarding a road on which the vehicle is travelling,
   determining, based on the received information regarding the road, a typical speed of travel associated with the road, and
   wherein the vertical position of the image recording device further depends at least in part on the determined typical speed of travel associated with the road on which the vehicle is travelling.

9. The method according to claim 8, wherein a horizontal position of the image recording device is changed.

10. The method according to claim 8, wherein a horizontal position of the image recording device is changed as a function of the road profile.

11. The method according to claim 8, wherein the image recording device is embodied as an infrared camera.

12. The method according to claim 11, wherein an infrared lighting device is present.

13. The method according to claim 8, wherein the image recording device is embodied as a radar.

14. The method according to claim 8, wherein the display is embodied as a head-up display.

15. The night vision system according to claim 1, wherein receiving information regarding the road on which the vehicle is travelling comprises recording images of the road by the image recording unit.

16. The night vision system according to claim 1, wherein receiving information regarding the road on which the vehicle is travelling comprises receiving road-related information from a navigation system coupled to the night vision system.

\* \* \* \* \*

UNITED STATES PATENT AND TRADEMARK OFFICE
CERTIFICATE OF CORRECTION

| | |
|---|---|
| PATENT NO. | : 8,878,932 B2 |
| APPLICATION NO. | : 11/994011 |
| DATED | : November 4, 2014 |
| INVENTOR(S) | : Cieler et al. |

It is certified that error appears in the above-identified patent and that said Letters Patent is hereby corrected as shown below:

On the Title Page
Item (86), Delete "PCT/JP2006/062292" and insert --PCT/EP2006/062292--

Signed and Sealed this
Third Day of March, 2015

Michelle K. Lee
*Deputy Director of the United States Patent and Trademark Office*